(12) United States Patent
Hudson et al.

(10) Patent No.: US 9,655,353 B1
(45) Date of Patent: May 23, 2017

(54) MULTI-SECTION FISHING DEVICE

(71) Applicant: Eric Hudson, Newton Grove, NC (US)

(72) Inventors: Eric Hudson, Newton Grove, NC (US); Van Lee, Four Oaks, NC (US)

(73) Assignee: Eric Hudson, Newton Grove, NC (US)

( * ) Notice: Subject to any disclaimer, the term of this patent is extended or adjusted under 35 U.S.C. 154(b) by 0 days.

(21) Appl. No.: 15/079,587

(22) Filed: Mar. 24, 2016

(51) Int. Cl.
*A01K 85/00* (2006.01)
*A01K 85/18* (2006.01)

(52) U.S. Cl.
CPC .............. *A01K 85/18* (2013.01); *A01K 85/00* (2013.01)

(58) Field of Classification Search
CPC ......... A01K 85/00; A01K 85/18; A01K 95/00
USPC .............. 43/42.36, 42.28, 44.9, 44.91, 42.09
See application file for complete search history.

(56) References Cited

U.S. PATENT DOCUMENTS

| | | | | |
|---|---|---|---|---|
| 327,100 A * | 9/1885 | Palm | ..................... | A01K 93/00 43/44.91 |
| 418,995 A * | 1/1890 | Tufts | ..................... | A01K 95/00 43/44.95 |
| 419,574 A * | 1/1890 | Vasseur | .................. | A01K 93/00 43/44.92 |
| 541,789 A * | 6/1895 | Kunzelman | ............ | A01K 93/00 43/44.91 |
| 676,724 A * | 6/1901 | McCargar | .............. | A01K 93/00 43/44.91 |
| 810,017 A * | 1/1906 | Ackerman | ............. | A01K 85/16 43/42.09 |
| 1,176,631 A * | 3/1916 | Wells | ..................... | A01K 93/00 43/44.91 |
| 1,240,043 A * | 9/1917 | Gregory | ................. | A01K 93/00 43/44.9 |
| 1,259,664 A * | 3/1918 | Peters | .................... | A01K 95/00 43/44.95 |
| 1,568,325 A * | 1/1926 | Dewey | ................... | A01K 85/16 43/42.09 |
| 2,241,851 A * | 5/1941 | Gilstrap | ................. | A01K 93/00 43/44.9 |
| 2,395,892 A * | 3/1946 | Lontz | ..................... | B63B 21/20 43/44.91 |
| 2,406,252 A * | 8/1946 | Potter | .................... | A01K 93/00 43/44.9 |
| 2,461,833 A * | 2/1949 | Mercier | ................. | A01K 95/00 43/43.1 |
| 2,611,211 A * | 9/1952 | Stockton | ............... | A01K 93/00 43/44.91 |
| 2,625,767 A * | 1/1953 | Pokras | ................... | A01K 85/00 43/42.09 |
| 2,741,067 A * | 4/1956 | Cox | ....................... | A01K 95/00 43/44.9 |
| 2,764,834 A * | 10/1956 | Klein | ..................... | A01K 85/16 43/42.09 |

(Continued)

*Primary Examiner* — Darren W Ark
(74) *Attorney, Agent, or Firm* — Coats & Bennett, PLLC

(57) ABSTRACT

A device for use during fishing configured to be connected to the user's fishing line to attract fish. The device is shaped to be moved through the water and generally include a head and a tail. A channel extends through at least a portion of the device and is sized to receive the fishing line. The device is constructed from multiple sections. The sections are selectively positionable between a closed configuration with the sections connected together to connect the device to the fishing line, and an open configuration with the sections being separated to remove the device from the fishing line.

15 Claims, 6 Drawing Sheets

(56) References Cited

U.S. PATENT DOCUMENTS

| | | | | |
|---|---|---|---|---|
| 2,793,461 A | * | 5/1957 | Korte | A01K 85/00 43/42.28 |
| 2,881,552 A | * | 4/1959 | Miller | A01K 93/00 43/44.91 |
| 2,958,153 A | * | 11/1960 | Yerman | A01K 93/00 43/44.91 |
| 3,019,546 A | * | 2/1962 | Hansen | A01K 91/04 43/44.91 |
| 3,107,451 A | * | 10/1963 | Sitzler | A01K 93/00 43/44.87 |
| 3,173,222 A | * | 3/1965 | Hansen | A01K 93/00 43/44.91 |
| 3,180,051 A | * | 4/1965 | Freeman | A01K 95/00 43/44.91 |
| 3,497,987 A | * | 3/1970 | Perrin | A01K 85/00 43/42.28 |
| 3,909,974 A | * | 10/1975 | Kent | A01K 85/00 43/42.39 |
| 3,913,257 A | * | 10/1975 | Colgan | A01K 85/16 43/42.09 |
| 3,947,990 A | * | 4/1976 | Johnson | A01K 93/00 43/44.9 |
| 3,967,407 A | * | 7/1976 | Halbasch | A01K 93/00 43/44.9 |
| 4,026,062 A | * | 5/1977 | Mosley | A01K 95/00 43/44.91 |
| 4,073,084 A | * | 2/1978 | Favron | A01K 85/16 43/42.36 |
| 4,098,017 A | * | 7/1978 | Hall | A01K 85/01 43/42.39 |
| 4,163,337 A | * | 8/1979 | Kress | A01K 85/00 43/42.36 |
| 4,215,506 A | * | 8/1980 | LeBoeuf | A01K 85/16 43/42.28 |
| 4,414,772 A | * | 11/1983 | Duncan | A01K 85/16 43/42.36 |
| 4,426,804 A | * | 1/1984 | Hutson | A01K 93/00 43/44.91 |
| 4,428,143 A | * | 1/1984 | Keller | A01K 91/18 43/44.9 |
| 4,615,136 A | * | 10/1986 | Bank | A01K 95/00 43/44.91 |
| 4,616,441 A | * | 10/1986 | Dmytriw | A01K 93/00 43/44.91 |
| 4,619,067 A | * | 10/1986 | West | A01K 85/00 43/42.09 |
| 4,693,031 A | * | 9/1987 | Koetje | A01K 75/00 43/44.91 |
| 4,803,798 A | * | 2/1989 | Hannah | A01K 95/00 43/42.36 |
| 4,845,877 A | * | 7/1989 | Koetje | A01K 75/04 43/7 |
| 4,856,219 A | * | 8/1989 | Severance | A01K 93/00 43/43.1 |
| 4,893,433 A | * | 1/1990 | Scheffler | A01K 93/00 43/44.91 |
| 4,941,280 A | * | 7/1990 | Rinaldi | A01K 85/16 43/42.09 |
| 5,031,351 A | * | 7/1991 | Rogel | A01K 95/00 43/44.9 |
| 5,152,094 A | * | 10/1992 | Strickland | A01K 85/00 43/42.36 |
| D332,820 S | * | 1/1993 | O'Brien | D22/146 |
| 5,222,321 A | * | 6/1993 | Lu | A01K 95/005 43/44.81 |
| 5,367,817 A | * | 11/1994 | Clark | A01K 85/00 43/42.36 |
| 5,600,916 A | * | 2/1997 | Smith | A01K 85/16 43/42.49 |
| 5,918,405 A | | 7/1999 | Marusak et al. | |
| 6,058,643 A | | 5/2000 | Marusak et al. | |
| 6,058,645 A | * | 5/2000 | Lummis | A01K 85/16 43/42.33 |
| 6,357,167 B1 | * | 3/2002 | Bradford | A01K 85/00 43/42.09 |
| 6,606,815 B1 | * | 8/2003 | Toris | A01K 85/14 43/42.09 |
| 6,851,217 B1 | * | 2/2005 | Rayner | A01K 95/005 43/44.91 |
| 6,931,786 B1 | * | 8/2005 | Bennett | A01K 93/00 43/44.91 |
| 7,162,830 B2 | * | 1/2007 | Sims | A01K 95/02 43/44.9 |
| 7,481,020 B1 | * | 1/2009 | Ruzicka | A01K 93/00 43/44.91 |
| 7,565,763 B1 | * | 7/2009 | Ruzicka | A01K 93/00 43/44.91 |
| 8,196,338 B2 | * | 6/2012 | Kavanaugh | A01K 91/047 43/44.91 |
| 8,402,688 B2 | * | 3/2013 | Choi | A01K 85/01 43/42.31 |
| 8,505,233 B1 | * | 8/2013 | Lund | A01K 85/01 43/44.87 |
| 8,627,594 B1 | * | 1/2014 | Weron | A01K 85/16 43/42.09 |
| 8,769,864 B2 | * | 7/2014 | Kavanaugh | A01K 93/00 43/44.91 |
| 8,910,415 B2 | * | 12/2014 | Farr, Jr. | A01K 85/00 43/42.28 |
| 9,173,385 B2 | * | 11/2015 | Cooper | A01K 85/01 |
| 9,392,780 B1 | * | 7/2016 | Boyette | A01K 95/00 |
| 2005/0246941 A1 | * | 11/2005 | Mitchell | A01K 85/01 43/42.36 |
| 2006/0042147 A1 | * | 3/2006 | Jenkins | A01K 91/04 43/42.09 |
| 2006/0162233 A1 | * | 7/2006 | Hueso Pajares | A01K 93/00 43/44.91 |
| 2009/0293338 A1 | * | 12/2009 | Lu | A01K 75/06 43/44.91 |
| 2011/0296737 A1 | | 12/2011 | Peluso | |
| 2015/0089859 A1 | * | 4/2015 | Jarvis, III | A01K 85/18 43/42.35 |

* cited by examiner

MULTI-SECTION FISHING DEVICE

BACKGROUND

A variety of different devices are used by fisherman to attract fish. These devices are attached to the fishing line and moved through the water. The devices may be configured to imitate a baitfish to attract the fish. The devices may also include bright colors, have particular shapes, or include materials such as feathers, animal hair, or plastic skirts that attract the fish.

The appropriate attracting device for a particular time may depend upon a wide number of variables, such as but not limited to the various weather conditions, time of year, water conditions, and type of fish one is trying to catch. Further, the conditions may change during a given day, such as when the weather changes or the fisherman goes to a different location or tries to catch a different type of fish. Further, fish are often finicky and may be keying on a particular color or shape on a particular day or at a particular time of the day. For example, orange-color devices may be effective on one day, but ineffective on the next day.

Because of this wide range of variables, it is often good practice for a fisherman to change their attracting device on a regular basis. This usually results in the fisherman catching more fish during the course of a day. A drawback to this practice of regularly changing device is the task is often tedious and time-consuming. The fisherman is often required to cut the fishing line to remove the current device. The fisherman selects the next device and connects it to the fishing line. This often requires tying one or more knots to connect the device to the fishing line.

Changing the device is also made more difficult because of the fishing environment. This environment may include a being on a boat that is moving due to waves, such as on an ocean or large lake. The boat may also be moving across the water as it moves to the next fishing location. Fishing often occurs at night, at sunrise, and at sunset, each of which provides little to no light for the fisherman to see. Also, the fisherman may be out in cold temperatures which degrades finger movement and feel, or may be in wet conditions due to rain. These various environments that are commonplace for a fisherman make it difficult to change a device.

SUMMARY

The present application is directed to a fish attracting device configured to be attachable to a user's fishing line. The device includes first and second sections and may be selectively configurable between a closed configuration with the sections connected together and forming a channel to receive the fishing line, and an open configuration with the sections separated to remove the device from the fishing line. The device provides for a straight-forward way to change devices and combinations of sections when the user is fishing.

One embodiment is directed to a device for attaching to a fishing line to attract fish that includes a body with an elongated shape with a longitudinal centerline. The body includes a head with an upstream tip and a downstream end. The body also includes an enclosed channel that extends along the longitudinal centerline through a center of the head from the tip to the end of the head. The body also includes a tail that extends outward from the end of the head along the longitudinal centerline. The tail includes first and second fins that are spaced apart by a slot that is aligned along the longitudinal centerline and with the fins being laterally spaced away from the longitudinal centerline. The body is constructed from first and second sections that are divided along the channel with a first portion of the channel being in the first section and a second portion of the channel being in the second section.

The head may have a tapered shape with the tip that is narrower than the end when measured perpendicular to the longitudinal centerline.

The head may have a circular cross-sectional shape within a plane that is perpendicular to the longitudinal centerline. The channel may be positioned within a center of the circle.

The body may include a second slot positioned along from the longitudinal centerline and including a first slot portion formed in the first section and a second slot portion formed in the second section with the first and second slot portions being aligned together to form the second slot.

The channel may have a circular cross-sectional shape within a plane that is perpendicular to the longitudinal centerline.

The end of the head may include a shoulder where the fins are spaced laterally inward from an outer side of the head.

The device may also include a projection that extends along the first portion of the channel and a receptacle that extends along the second portion of the channel with the projection sized to fit within the receptacle and form an interference fit to maintain the first section connected to the second section.

Each of the fins may include a relatively flat face that is oriented towards each other and which are located on opposing sides of the longitudinal centerline.

Each of the fins may include an enlarged flange having a shoulder and positioned at a distal end opposite from the head.

Another embodiment is directed to a device for connecting to a fishing line to attract fish. The device includes a body with first and second sections each having a head, an indent, and a tail. The head has an elongated shape with an upstream tip and a downstream end. The head also includes a curved outer face and a relatively flat inner face. The indent is located at the inner face and extends in a straight line from the tip to the end. The indent has an open side and curved sidewalls. The tail extends outward from the end of the head. The tail is laterally offset from a projection of the indent that extends outward beyond the end of the head. The body is adjustable between a first configuration with the first section connected to the second section and a second configuration with the first section spaced away from the second section. In the first configuration, the inner faces of the head face together with the indents being aligned and forming a continuous, enclosed channel that extends through the head.

The device may further include a projection that extends outward from the inner face of the first section and a receptacle that extends into the inner face of the second section. The projection may be positioned within the receptacle in the first configuration to connect the first and second sections.

The head of each of the first and second sections may have a tapered shape with the tip having a narrower width than the end when measured in a plane perpendicular to an axis of the indent.

The head in the first configuration may have a circular cross-sectional shape within a plane that is perpendicular to the enclosed channel.

The device of claim 9, wherein the enclosed channel in the first configuration may have a circular cross-sectional shape within a plane that is perpendicular to the enclosed channel.

Each of the tails may include a single fin that extends outward from the end of the head, or may include a pair of fins that are spaced apart and that each extend outward from the end of the head.

The end of the head may include a shoulder where the tail is spaced laterally inward from an outer side of the end of the head.

The inner faces of the first and second sections may abut together in the first configuration.

Another embodiment is directed to a device for connecting to a fishing line to attract fish. The device includes a body with first and second sections that each include a head, a tail, and an indent. The head includes an upstream tip and a downstream end. The head also includes a curved outer face and a relatively flat inner face. The tail extends outward from the head and includes a flange at a distal end opposite from the head. The indent is positioned in the inner face and extends in a straight line from the tip to the end of the head. The indent has an open side and curved sidewalls. The body is adjustable between a first configuration with the first section connected to the second section and a second configuration with the first section spaced away from the second section. In the first configuration, the inner faces of the head abut together with the indents aligned forming a continuous, enclosed channel that extends through the head. The body includes a longitudinal centerline in the first configuration that is spaced away from the tail.

The tail may be laterally offset from the longitudinal centerline.

Another embodiment is directed to a device for connecting to a fishing line to attract fish. The device includes: a body with first and second sections. Each of the first and second sections includes a head with an elongated shape that includes an upstream tip and a downstream end, and a curved outer face and a relatively flat inner face, a channel indent in the inner face that extends in a straight line from the tip to the end and having an open side and curved sidewalls, a tail that extends outward from the end of the head and is laterally offset from a projection of the channel indent that extends outward beyond the end of the head, and a slot indent in the inner face that is laterally offset from the channel and exposed along the curved outer face of the head. The body is adjustable between a first configuration with the first section connected to the second section and a second configuration with the first section spaced away from the second section. The first configuration includes the inner faces of the head facing together with the channel indents aligned forming a continuous, enclosed channel that extends through the head and the slot indents aligned forming an enlarged slot.

The various aspects of the various embodiments may be used alone or in any combination, as is desired.

DETAILED DESCRIPTION

The present application is directed to a device configured to be connected to fishing line to attract fish. The device is shaped to be moved through the water and generally includes a head and a tail. A channel extends through at least a portion of the device and is sized to receive the fishing line. The device is constructed from multiple sections. The sections are selectively positionable between a closed configuration with the sections connected together to connect the device to the fishing line, and an open configuration with the sections being separated to remove the device from the fishing line.

Figure 1:
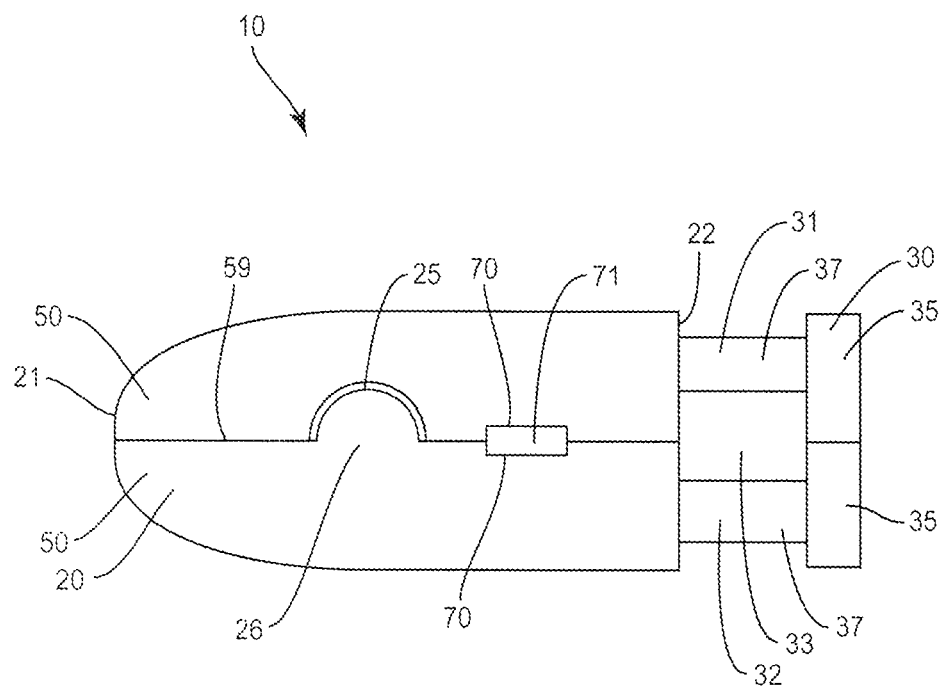
FIG. 1 is a side view of an attractor.
Figure 2:
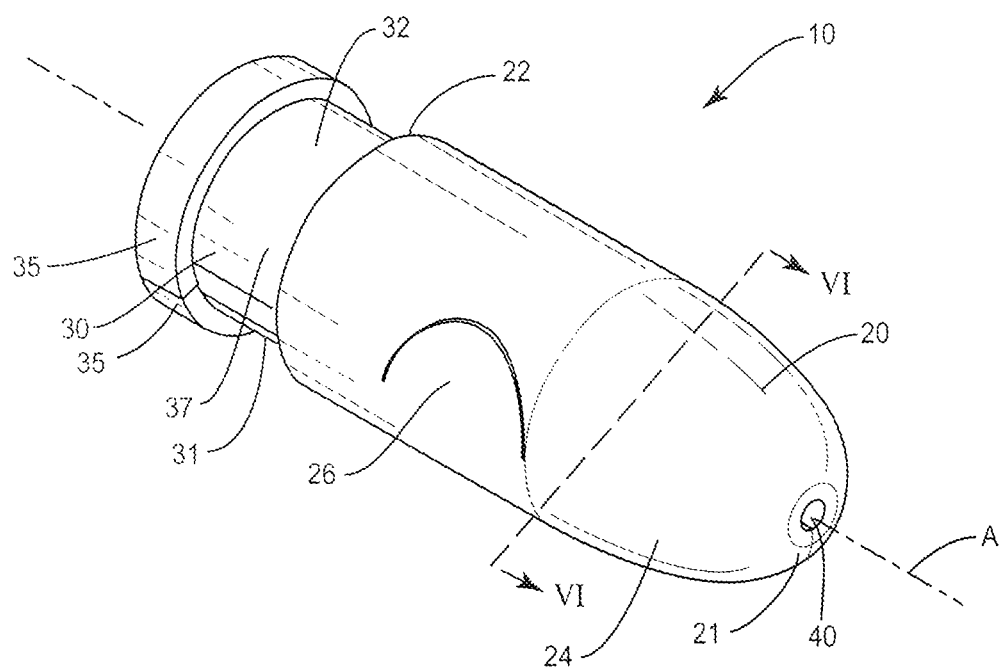
FIG. 2 is a front perspective view of an attractor.
Figure 3:
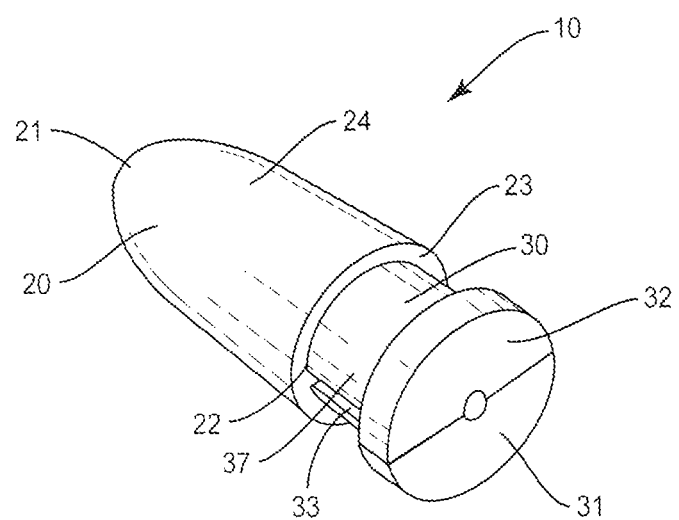
FIG. 3 is a rear perspective view of an attractor

FIGS. 1, 2, and 3 illustrate various attractors 10. The attractors 10 include a body with a head 20 and a tail 30. The attractors 10 include an elongated shape with a longitudinal centerline A that extends through a center of the body along the length of the device. A channel 40 extends through a center of the head 20 and is aligned on the longitudinal centerline A. The channel 40 is sized to receive the fishing line, and includes a curved shape in a plane perpendicular to the longitudinal centerline A without any jagged edges that could damage the fishing line. The channel 40 being positioned at the center of the device facilitates the movement through the water in a generally straight direction with the head 20 being upstream from the tail 30.

The head 20 includes a tip 21 at a front, proximal end and an opposing end 22. The head 20 includes a tapered shape with the tip 21 being narrower than the end 22. In one embodiment, the end 22 includes the greatest width measured in a plane that is perpendicular to the longitudinal centerline A. The shape is formed similar to a bullet to facilitate movement through the water. The head 20 may include a circular cross-sectional shape along a majority or entirety of the length when cut along the plane that is perpendicular to the longitudinal centerline A. The end 22 includes a shoulder 23 that is formed by the tail 30 being positioned laterally inward from an outer side 24 of the head 20. The end 22 may be substantially flat and aligned in the perpendicular plane.

Figure 4:
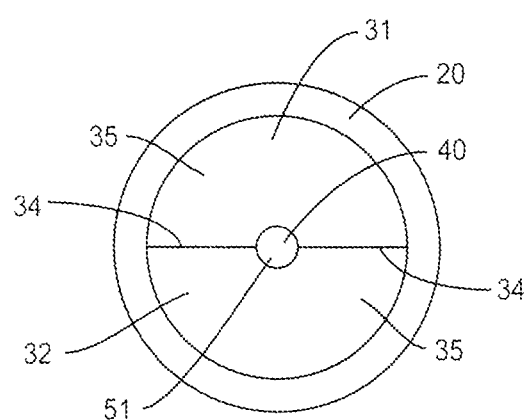
FIG. 4 is a rear review of an attractor.

The tail 30 extends outward from the end 22 of the head 20 along the longitudinal centerline A. The tail 30 includes a first fin 31 and a second fin 32. Each fin 31, 32 includes a mounting section 37 that extends longitudinally outward from the end 22 of the body 20, and a flange 35 at the distal end. The flange 35 extends laterally outward beyond the adjacent outer side of the mounting section 37. The mounting section 37 provides a space to attach a skirt or other similar device to the attractor 10. As illustrated in FIG. 4, the outer envelope of the tail 30 that is formed by the flanges 35 may be smaller than that of the head 20. In another embodiment, the outer envelopes of the tail 30 and head 20 are the same. The mounting sections 37 are positioned within the outer envelope of the head 20 (and the flanges 35).

FIG. 4 is a rear view of a device 10 that illustrates the fins 31, 32 with flanges 35 that abut together. Each of the flanges 35 includes an inner side 34 that face together towards each other. The inner sides 34 of the flanges 35 may be substantially flat to facilitate the abutting positioning. Each flange 35 includes an indent 51 that are aligned together to form a portion of the channel 40. Other designs may include the inner sides 34 of the fins 31, 32 being spaced apart with an intermediate slot. The slot is aligned with and forms a portion of the channel 40.

As illustrated in FIGS. 1 and 2, the longitudinal centerline A of the device 10 extends along the channel 40 in the head 20, along the slot 33 formed between the mounting sections 37 of the fins 31, 32 of the tail 30, and through the opening in the flanges 35 of the tail. The channel 40 extends through the length of the head 20 from the tip 21 to the end 22. The channel 40 is enclosed along the length of the head 20 and formed by curved sidewalls that extend along this length. The channel 40 along the body 20 and the flanges 35 includes a circular cross-sectional shape when measured in a plane perpendicular to the longitudinal centerline A. The circular shape of the channel 40 prevents the device 10 from damaging the fishing line as the line moves through the head 20.

Figure 5:
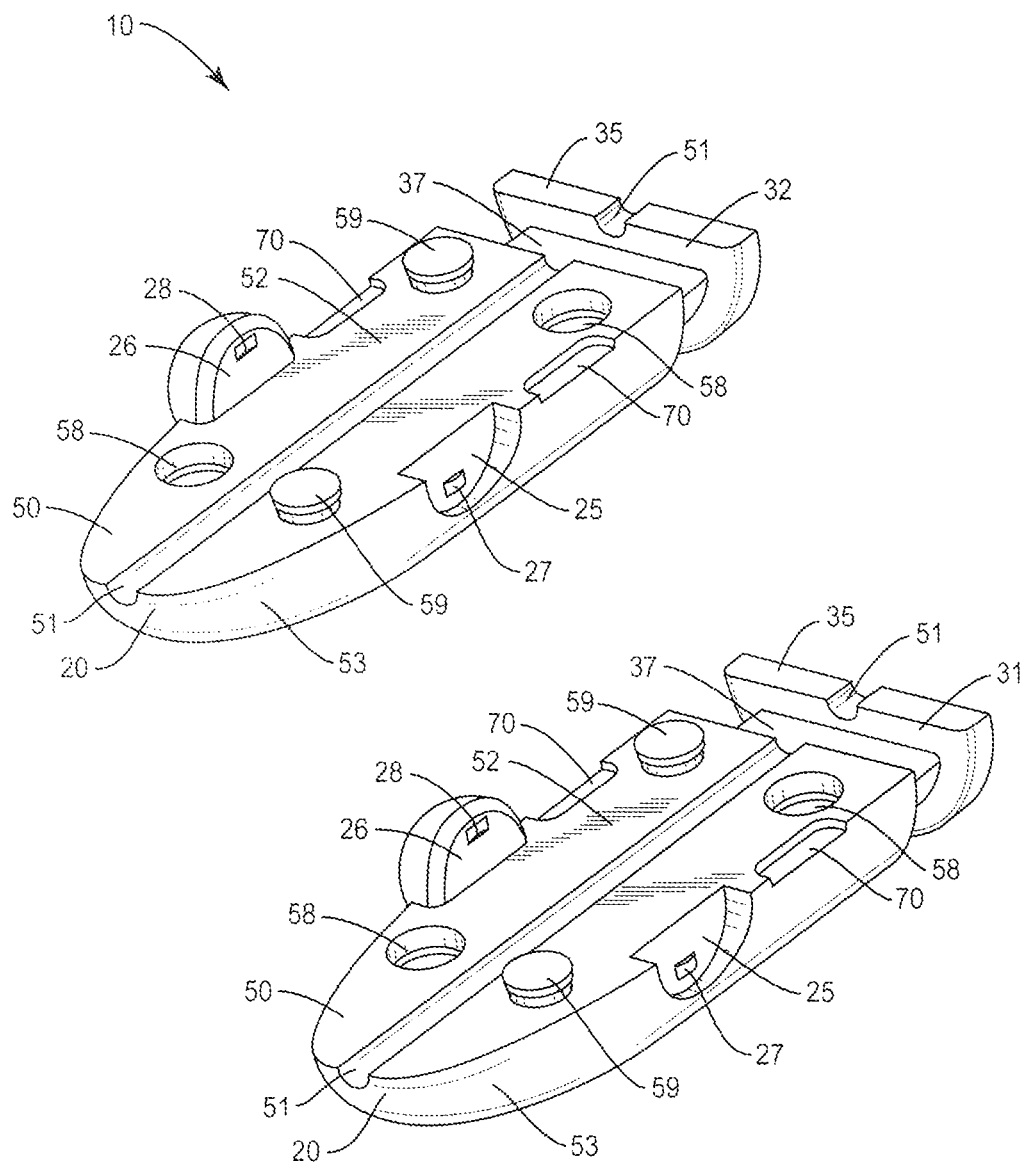
FIG. 5 is a perspective view of first and second sections in an open configuration.

The attractor 10 as illustrated in FIG. 5 is divided into separate sections 50 that are selectively positionable between a closed configuration and an open configuration. In the closed configuration, the sections 50 are connected together to form the enclosed channel 40 to connect the attractor 10 to the fishing line. In the open configuration, the sections 50 are separated such that the attractor 10 can be removed from the fishing line.

FIG. 5 includes an attractor 10 with first and second sections 50. Each of the sections 50 includes an outer side 53 having a curved shape, and an inner face 52. The sections 50 each comprise half of the overall attractor 10. When the sections 50 are connected together, the faces 52 are positioned together and the outer sides 53 align to form the overall tapered, bullet shape of the head 20 and the extending tail 30.

As illustrated in FIG. 5, the face 52 of each section 50 may be substantially flat to facilitate connection of the sections 50. The faces 52 may abut together in the closed configuration, or may be positioned slightly spaced apart. Each face 52 also includes indents 51 that extend the length of the head 20. The indents 51 include an open side that faces outward and a curved sidewall. As illustrated, the sidewalls extend the entire length of the indents 51. When the sections 50 are connected together, the indents 51 align and form the enclosed channel 40.

As illustrated in FIG. 5, each section 50 may also include at least one projection 59 that extends outward from the face 52, and at least one receptacle 58 that extends into the face 52 and is sized to receive the corresponding projection 59. When the sections 50 are in the closed configuration, the one or more projections 59 extend into the corresponding one or more receptacles 58 to form an interference fit to connect the sections 50.

The flanges 35 may also be configured to engage together when the sections 50 are connected. One of the flanges 35 may include an extension that extends outward from the flange between the outer edge and the indent 51. The corresponding flange 35 on the opposing section 35 may include a recess positioned between the outer edge and the indent 51. When the sections 50 are connected together, the extension fits into the recess. This configuration facilitates aligning the tail sections when the sections 50 are connected together.

Figure 6:
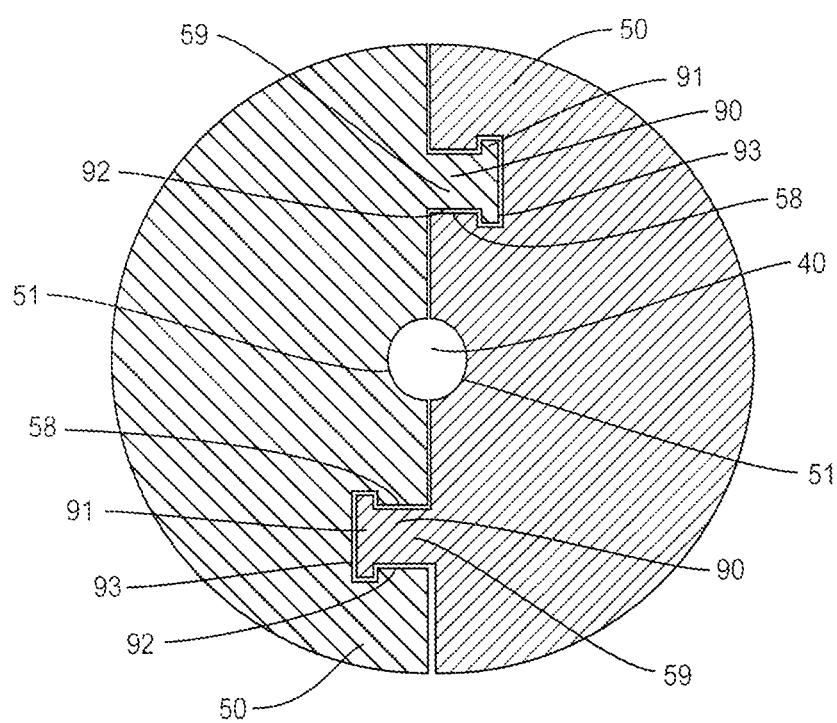
FIG. 6 is a section view along line VI-VI of FIG. 2 illustrating first and second sections connected together.

FIG. 6 illustrates the sections 50 in a closed configuration with corresponding projections 59 positioned in corresponding receptacles 58. Each projection 59 includes a neck 90 with a relatively narrow width and a head 91 with a larger width. The corresponding receptacle 58 on the opposing section 50 includes a narrow first section 92 and wider second section 93. When the sections 50 are being connected together, the head 91 of each projection 59 may be compressed as it moves along the first section 92 of the receptacle 58. When the head 91 moves into the second section 93, the head 91 expands. This causes an audible sound and/or tactile feel that is heard/felt by the user thus confirming that the sections 50 are connected together. The enlarged head 91 further maintains the sections 50 together during use.

The number and arrangement of the projections 59 and receptacles 58 on each section 50 may vary. FIG. 5 includes each section 50 with a pair of projections 59 and opposing sides of the indent 51. A first projection 59 is on a first lateral side of the front of the body 20 and a second projection 59 on a second lateral side at the back of the body 20. Corresponding receptacles 58 are likewise positioned on each section 50.

The projections 59 and corresponding receptacles 58 may be slightly misaligned to add further interference when the sections 50 are connected together. This may include a center of the projections 59 being laterally offset from the centerline A a different amount than a center of the corresponding receptacle. This offset provides for additional interference that strengthens the interference fit between the sections 50 when connected together.

Each of the sections 50 may also include an extension 26 also extends outward from the inner face 52. A corresponding cavity 25 is positioned on an opposing lateral side of the indent 51. The extension 26 in the first section 50 is sized and shaped to engage with a corresponding cavity 25 in the second section 50. Thus, when the sections 50 are connected together, each section 50 includes an extension 26 that extends into and engages with the corresponding cavity 25. The extensions 26 and cavities 25 may be configured to facilitate the connection, such as with a ball and detent combination 27, 28 that engage together. The cavity 25 may be larger than the corresponding extension 26, or may be larger or offset to provide for additional interference to strengthen the connection between the sections 50.

The extensions 26 further provide the aesthetic appearance of an eye to further attract fish to the device 10. The two extensions 26 positioned on opposing sides of the body 20 give the appearance of a fish moving through the water. Markings with paint or other indicia may be attached to the outer side of the extension 26 to provide additional aesthetics.

The sections 50 may be difficult to disconnected during use, therefore, the device 10 includes a slot 71 to facilitate the separation of the sections 50. As illustrated in FIGS. 1 and 5, one or more indents 70 extend into the inner face 52 of each section 50. When the sections 70 are connected together, the indents 70 align and form the slot 71 that is sized to receive a tip of tool that is used to pry apart the sections 50. This positioned along the exterior edge provides for the indents 70 to be accessible when the body sections 50 are connected together.

FIGS. 1 and 5 include slots 71 formed by indents 70 in each section 50. In another embodiment, the slot 71 is formed by a single indent 70 (i.e, just one of the sections 50 includes an indent 70). As illustrated in FIG. 1, the slot 33 formed between the mounting sections 37 in the tail 30 may also be used for insertion of a tool to pry apart the sections 50.

Figure 7:
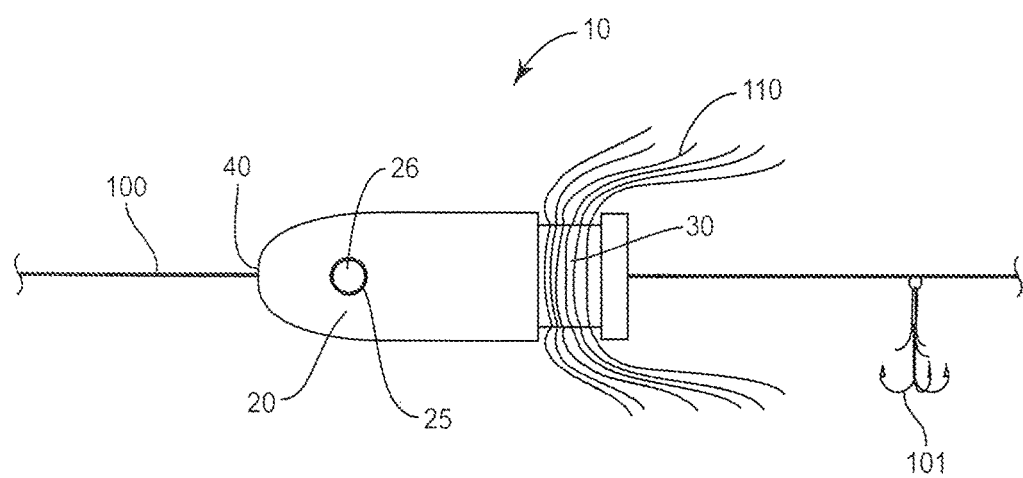
FIG. 7 is a side view of an attractor connected to fishing line.

FIG. 7 illustrates the attractor 10 in use. During connection to the fishing line 100, the fisherman aligns the fishing line 100 with the indents 51 of the two sections 50. The fisherman than connects the sections 50 together to form the channel 40, such as through engagement with the one or more projections 59 and receptacles 58 as explained above and illustrated in FIG. 6. The fishing line 100 extends through the channel 40 in the head 20 and the slot 33 of the tail 30 (and thus does not contact against the fins 31, 32 along the tail 30). The size of the channel 40 relative to the fishing line 100 and the spacing of the fins 31, 32 away from the fishing line 100 provides for the attractor 10 to move along the fishing line 100. Hooks 101 may be positioned along the fishing line 100 in proximity to the attractor 10 to hook a fish. One or more swivels (not illustrated) may be positioned along the line 100 to limit the extent of movement of the attractor along the line 100 as the swivels are larger than the channel 40. It is understood that the fishing line 100 may include a leader that prevents a fish from breaking and/or biting through the line.

The attractor 10 may be removed from the fishing line 100 by the user disconnecting the two sections 50. The fisherman may be able to grasp each section 50 with their fingers and pull them apart. Alternatively, a tool, such as a screwdriver, may be inserted in the slot 70 formed between the sections 50. The tool may be used to pry the sections 50 apart.

The multi-piece construction provides for removing and replacing the attractor 10 without cutting the fishing line 100. This provides for quick changes of the attractor 10, such as at a time when the fish are biting, and during poor environmental conditions. The different sections 50 may be constructed in different colors, as well as the skirts 110 that are attached to the tail 30. Thus, the fisherman may adjust the color of the attractor 10 as they feel necessary while fishing.

The eyes may also be formed by separate elements that are attached to the body 20. The body 20 includes a pair of cavities on opposing sides of the channel 20. Eyes are positioned within each of the cavities to give the device 10 a fish-like appearance. The eyes are separate elements that are attached in the cavity. The eyes may be attached in various manners, including an interference fit, snap-fit with one of the body 20 and eye including a receptacle and the other including a protrusion that fits within the receptacle, adhesive, and mechanical fastener.

To separate the connections sections 50, a tool is inserted into the slot 71 formed by the one or more indents 70. In another embodiment, the tool is inserted between the mounting sections 37 of the fins 31, 32 and a force applied to separate the sections 50.

The embodiments described above include the device 10 acting as an attractor to lure the fish to the hooks 101 that are separately attached to the fishing line 100 as illustrated in FIG. 8. The device 10 itself may be equipped with one or more hooks 101.

FIGS. 1 and 5 include each section 50 including one of the fins 31, 32. Alternatively, the sections 50 may include a portion of each of the fins 31, 32. The sections 50 may also include a portion of the intermediate slot 33.

The device 10 may be constructed from various materials, including but not limited to various plastics, lead, and metals. The attractor 10 may be constructed to float or sink in the water. In one embodiment, gaps are formed on the faces 52 of each section that form an enclosed area that holds air when the sections 50 are connected together. The enclosed area 52 provides for the attractor 10 to float. In another embodiment, one or more weights may be positioned in the head 20 of each section 50 causing the attractor 10 to sink. Further, the various materials may provide for sinking or floating as necessary.

As used herein, the terms "having", "containing", "including", "comprising" and the like are open ended terms that indicate the presence of stated elements or features, but do not preclude additional elements or features. The articles "a" "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A device for attaching to a fishing line to attract fish, the device comprising:
a body with an elongated shape with a longitudinal centerline, the body comprising:
a head with an upstream tip and a downstream end;
a first enclosed channel that extends along the longitudinal centerline through a center of the head, the channel extending from the tip to the end of the head, the channel having a circular sectional shape along an entirety of the head in a plane perpendicular to the longitudinal centerline;
a tail that extends axially outward from the end of the head, the tail comprising first and second mounting sections and a flange at ends of the mounting sections away from the head;
a second enclosed channel that extends along the longitudinal centerline through a center of the flange and having a circular shape in the plane perpendicular to the longitudinal centerline;
a slot formed between the first and second mounting sections and positioned along the longitudinal centerline between the head and the tail, the slot intersects and extends transversely across the longitudinal centerline and includes open sides which are opposed to each other and are open to an exterior of the device;
the body being constructed from first and second separate pieces that are divided along the first and second channels with a first portion of the first and second channels, a first portion of the flange, and the first mounting section being part of the first piece and a second portion of the first and second channels, a second portion of the flange, and the second mounting section being part of the second piece.

2. The device of claim 1, wherein the head has a tapered shape with the tip having a narrower width than the end when measured perpendicular to the longitudinal centerline.

3. The device of claim 1, wherein the body further comprises a second slot formed at an intersection of the first and second pieces, the second slot including a first slot portion formed in the first piece and a second slot portion formed in the second piece, the first and second slot portions being aligned together to form the second slot.

4. The device of claim 1, further comprising a projection that extends outward from the first piece and includes a narrow neck and an enlarged distal end and a receptacle in the second piece that includes a narrow first portion at a face of the second piece and an enlarged second portion spaced further from the face, the projection being positioned in the receptacle in a closed position with the neck aligned at the first portion and the distal end aligned at the second portion.

5. The device of claim 1, wherein the end of the head includes a shoulder where the mounting sections are spaced laterally inward from an outer side of the head.

6. The device of claim 1, further comprising a projection on the first piece that extends along the first portion of the channel and a receptacle on the second piece that extends along the second portion of the channel, the projection sized to fit within the receptacle and form an interference fit to maintain the first piece connected to the second piece.

7. The device of claim 1, wherein each of the mounting sections comprises a flat face, the faces being oriented towards each other and being located on opposing sides of the longitudinal centerline.

8. A device for connecting to a fishing line to attract fish, the device comprising:
- a body with first and second sections, each of the first and second sections comprising:
  - a head with an elongated shape that includes an upstream tip and a downstream end, the head also comprising a curved outer face and a relatively flat inner face;
  - a first channel indent in the inner face that extends in a straight line from the tip to the end, the first channel indent having an open side and a curved sidewall;
  - a mounting section that extends outward from the end of the head, the mounting section being laterally offset from a projection of the first channel indent that extends outward beyond the end of the head;
  - a flange mounted to an end of the mounting section opposite from the head, the flange comprising a flat inner face with a second channel indent having an open side and a curved sidewall;
  - a slot indent in the inner face of the head that is laterally offset from the first channel indent and exposed along the curved outer face of the head;
- the body being adjustable between a first configuration with the first section connected to the second section and a second configuration with the first section spaced away from the second section;
- the first configuration including the inner faces of the head and the flange facing together with the channel indents aligned forming an enclosed first channel that extends through the head and an enclosed second channel that extends through the flange and the slot indents aligned forming an enlarged slot;
- the first configuration also including the mounting sections positioned on opposing sides of a second slot that extends along the longitudinal centerline with the mounting sections being spaced apart on opposing sides of the second slot with the second slot being located between the head and the flange and being exposed at sides thereof to an exterior of the device.

9. The device of claim 8, further comprising a projection that extends outward from the inner face of the first section and a receptacle that extends into the inner face of the second section, the projection being positioned within the receptacle in the first configuration to connect the first and second sections.

10. The device of claim 8, wherein the head of each of the first and second sections has a tapered shape with the tip having a narrower width than the end when measured in a plane perpendicular to the longitudinal centerline.

11. The device of claim 8, wherein the head in the first configuration has a circular cross-sectional shape within a plane that is perpendicular to the enclosed channel.

12. The device of claim 8, wherein the first and second enclosed channels in the first configuration have circular cross-sectional shapes within planes that are perpendicular to the first and second enclosed channels.

13. The device of claim 8, wherein each of the mounting sections comprises a single mounting section that extends outward from the end of the head.

14. The device of claim 8, wherein the inner faces of the first and second sections abut together in the first configuration.

15. A device for connecting to a fishing line to attract fish, the device comprising:
- a body with first and second sections, each of the first and second sections comprising:
  - a head with an upstream tip and a downstream end, the head also comprising a curved outer face and a relatively flat first inner face;
  - a tail that extends outward from the head and includes a mounting section and a flange at a distal end of the mounting section opposite from the head, the flange having a relatively flat second inner face;
  - a first channel indent in the first inner face that extends in a straight line from the tip to the end of the head and a second channel indent in the second inner face, the channel indents having open sides and curved sidewalls;
  - a projection that extends outward from the first inner face and includes a narrow neck and a wider distal end;
  - a receptacle in the first inner face that includes a narrow first section that extends inward from the first inner face and a wider second section spaced away from the first inner face;
- the body being adjustable between a first configuration with the first section connected to the second section and a second configuration with the first section spaced away from the second section;
- the first configuration including the first inner faces of the heads and the second inner faces of the flanges respectively abutting together with the channel indents aligned forming an enclosed channel that extends through at least a portion of the heads and the flanges;
- the first configuration including a slot in the enclosed channel that extends between the heads and the flanges and formed between the mounting sections;
- the first configuration further including each of the projections on each of the sections mounted in one of the receptacles of the opposing section with the narrow necks positioned along the narrow first section and the wider distal ends positioned along the wider second section;
- the body includes a longitudinal centerline in the first configuration that is spaced away from the mounting sections and the slot being exposed laterally to an exterior of the device with respect to the longitudinal centerline.

* * * * *